United States Patent [19]

Rosenzweig

[11] Patent Number: 4,575,618

[45] Date of Patent: Mar. 11, 1986

[54] SWITCH UNIT FOR USE WITH HEAT-RECOVERABLE ARTICLES

[75] Inventor: Nachum Rosenzweig, Palo Alto, Calif.

[73] Assignee: Raychem Corporation, Menlo Park, Calif.

[21] Appl. No.: 634,241

[22] Filed: Jul. 25, 1984

[51] Int. Cl.$^4$ ............................................. H05B 3/58
[52] U.S. Cl. ................................... 219/535; 219/505; 219/517; 219/541; 219/553; 156/86; 200/61.08; 337/208; 337/402
[58] Field of Search .............. 219/505, 507, 509, 494, 219/510, 511, 512, 517, 535, 541, 553; 156/86; 200/61.08, 61.62; 264/27, 230; 337/17, 208, 304, 237, 318, 319, 402, 403, 405, 406; 174/DIG. 8, 68 A

[56]  References Cited

U.S. PATENT DOCUMENTS

| | | | |
|---|---|---|---|
| 2,459,015 | 1/1949 | Clement | 337/406 |
| 3,731,248 | 5/1973 | Plasko et al. | 337/208 |
| 3,950,604 | 4/1976 | Penneck | 174/68 A |
| 3,958,206 | 5/1976 | Klint | 337/406 |
| 4,085,286 | 4/1978 | Horsma et al. | 174/DIG. 8 X |
| 4,304,616 | 12/1981 | Richardson | 156/86 |
| 4,366,201 | 12/1982 | Changani et al. | 264/230 X |
| 4,378,323 | 3/1983 | Brandeau | 264/27 |
| 4,421,582 | 12/1983 | Horsma et al. | 219/553 X |
| 4,453,159 | 6/1984 | Huff et al. | 219/535 X |
| 4,493,985 | 1/1985 | Keller | 219/535 |

FOREIGN PATENT DOCUMENTS

| | | | |
|---|---|---|---|
| 547270 | 8/1942 | United Kingdom | 337/406 |
| 1265194 | 3/1972 | United Kingdom | 219/553 |

Primary Examiner—Volodymyr Y. Mayewsky
Attorney, Agent, or Firm—Stephen C. Kaufman; Timothy H. P. Richardson

[57]  ABSTRACT

A heat-recoverable article which can be connected to a power supply and a switch unit which comprises a thermally-responsive member which can be thermally coupled to the article. The thermally-responsive member, when so coupled, regulates the passage of current through the article. The article heats and recovers and current through the article is regulated automatically.

10 Claims, 1 Drawing Figure

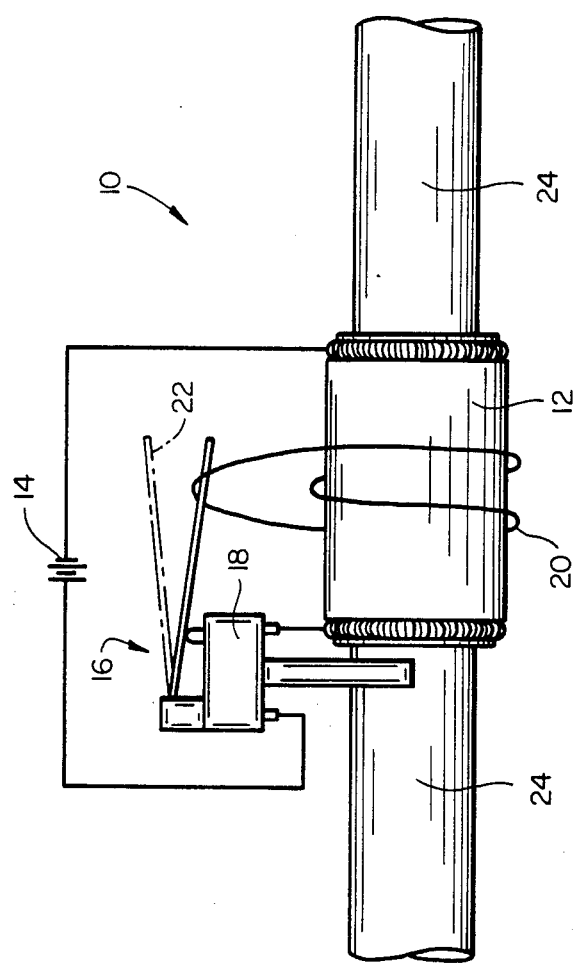
FIG_1

SWITCH UNIT FOR USE WITH HEAT-RECOVERABLE ARTICLES

CROSS-REFERENCE TO RELATED APPLICATIONS

This application is related to application Ser. No. 596,761 filed Apr. 4, 1984, by Nachum Rosenzweig, to application Ser. No. 607,991 filed May 7, 1984, by Corey McMills, and to application Ser. No. 634,242 which is being filed contemporaneously with this application by Rosenzweig and Skanderup. The entire disclosure of each of these applications is incorporated by reference herein. Each of those application is copending and commonly assigned.

BACKGROUND OF THE INVENTION

1. Field of the Invention

This invention relates to methods for joining and repairing substrates and in particular to an assembly comprising a heat-recoverable article and a switch unit which regulates the passage of current through the article.

2. Introduction to the Invention

Many methods are known for joining, repairing and reinforcing pipes and other substrates, including methods which make use of heat-recoverable articles comprising conductive polymers, which, when powered, supply the heat needed to cause recovery of the article. Reference may be made for example to U.S. Pat. Nos. 4,085,286, 4,177,446 and 4,421,582 and U.K. Pat. No. 1,265,194, the disclosures of which are incorporated herein by reference.

SUMMARY OF THE INVENTION

I have now discovered that substantial improvements and advantages can be provided in the performance and operation of a heat-recoverable article by providing an assembly comprising a heat-recoverable article which can be connected to a power supply to cause electrical current to pass through the article and to cause the article to heat and recover; and a switch unit which comprises (i) an electrical switch which can be connected into a circuit comprising the recoverable article and a power supply, and which, when so connected, regulates the flow of current through the heat-recoverable article, and (ii) a thermally-responsive member which can be thermally coupled to the heat-recoverable article and which, when so coupled, controls the electrical switch in response to change in the temperature of the article.

The article preferably comprises a heat-recoverable element which is composed of a sintered conductive polymer composition comprising (a) a matrix consisting essentially of organic polymer particles which have been sintered together so that the particles have coalesced without losing their identity, and (b) a particulate conductive filler which is dispensed in said matrix but is present substantially only at or near the boundaries of the coalesced particles.

In another aspect of the invention there is provided a method of repairing, reinforcing, joining or otherwise modifying a substrate, which method comprises (1) placing adjacent the substrate an assembly comprising
  (a) a heat recoverable article which is connected to a power supply to cause current to pass through the article;
  (b) a switch unit which comprises
    (i) an electrical switch which is connected into a circuit comprising the recoverable article and the power supply, and which regulates the passage of current through the heat-recoverable article, and
    (ii) a thermally-responsive member which is thermally coupled to the heat-recoverable article and which controls the electrical switch in response to change in the temperature of the article; and (2) passing current through the heat-recoverable article until the switch unit regulates the passage of current through the article, thereby adhering the article to the substrate.

BRIEF DESCRIPTION OF THE DRAWING

The invention is illustrated in the accompanying drawing in which FIG. 1 is a schematic diagram of the assembly of the invention.

DETAILED DESCRIPTION OF THE INVENTION

The thermally-responsive member is preferably a plastic fuse and comprises a material that contacts the article and holds the electrical switch in a closed position when the article is within a predetermined temperature range and enables the electrical switch to move to an open position when the material is above the predetermined temperature range. Preferably, the thermally-responsive member comprises a material that has a melting point at least that of the heat-recoverable article and the electrical switch moves to the open position when the material melts.

The material preferably comprises a polymer, e.g. nylon filament. The nylon filament preferably has a first portion that is wrapped around the article and a second portion which is initially secured under tension to the electrical article, so that in response to change in temperature of the article, the nylon filament can melt so that the electrical switch can move to the open position.

Attention is now directed to FIG. 1 which shows an assembly 10 of the present invention. The assembly 10 includes a heat-recoverable article 12 adapted to be connected to an AC or DC power supply 14 to cause current to pass through the article 12 and to cause the article to heat and recover. The assembly 10 comprises a switch unit 16 which comprises an electrical switch 18, e.g. a toggle microswitch 22 having an open and close position, and a thermally-responsive member 20, here, nylon filament, coupled to the article 12 and which, when so coupled, controls the electrical switch 18 in response to change in the temperature of the article 12.

In order to repair a substrate 24, which may be, for example, metal or polyethlene, current is passed through the article 12. The thermally-responsive member 20 "senses" the outer surface temperature of the article 12. When the melting-point of the nylon filament is reached, it melts and breaks, thereby enabling the electrical switch 18 to move to the open position. Note that the melted mylon filament wets and sticks to the surface of the article 12 to indicate that the article 12 has recovered. Also, the method is automatic and takes into account weather conditions, e.g. the colder the weather, the longer the heating time until the electrical switch 18 moves to the open position.

The invention is illustrated by the following Example.

EXAMPLE

UHMWPE powder (Hostalen GUR-413, available from American Hoechst), 95 parts by volume, having a molecular weight of about 4.0 million and an average particle size of about 0.1 mm, and carbon black (Ketjen Black EC, available from Akzo Chemie), 5 parts by volume, were thoroughly mixed together in a high speed blender. The mixture was used to fill a cylindrical mold having an annular cross-section (inner diameter 0.8 inch, outer diameter 1.2 inch). The mixture was compacted in the mold at room temperature for about 5 minutes, using a pressure of about 15,000 psi, and was then sintered in the mold at about 230° C. for about 60 minutes, using a very low pressure (2 psi or less). When sintering was complete, the sintered mixture was cooled in the mold to about 50° C., while maintaining it under a pressure of about 12,000 psi. The mold was then opened and the sintered product removed. The product was about 2 inch long.

The sintered product was cross-linked by irradiating it to a dosage of about 3 Mrad, and was then rendered heat-shrinkable by expanding it at 120° C. to an inner diameter of about 1.2 inch, using a conical mandrel. Circular grooves 0.25" wide were machined on both sides, 0.030" from and parallel to the cylindrical edge. Silver paint was painted onto the surface of the grooves. Two annular tension springs were placed inside the grooves to form shrinkable electrodes. The resistance of the product between the electrodes was 3.8 ohms, the conductive polymer having a resistance of about 3 ohm.cm.

The sintered product was used to couple together two polyethylene pipes having an outer diameter of about 0.84 inch and a wall thickness of about 0.11 inch. The ends of the pipes were placed within the coupler, the pipe ends being butted together at the center of the coupler.

The spring electrodes were connected to a 24 volt DC power supply by means of copper wires. One of the two wires was connected through a toggle microswitch that had to displace about 0.3" at its tip in order to open the circuit. The microswitch was located on a special grip above the coupler surface. An extrusion spinned, nylon 6 filament, available from Allied Chemicals under the trade name Capron, was twice wrapped around the center zone of the coupler circumference and then connected to the microswitch arm under enough tension so that the switch remained in the ON position. The power supply was turned on and an electrical current of about 6 amperes passed through the microswitch and the coupler, causing the coupler to heat up and to shrink upon the pipe. The surface temperature of the coupler was monitored by means of an infrared thermometer with a 0.015" target spot. When the surface temperature of the coupler reached 215° C., the nylon filament melted and broke releasing the switch and therefore opening the circuit. The coupled pipes, after cooling, were tested and inspected. The coupled pipe met and exceeded the ASTM test requirements for polyethylene tubing. The fused nylon filament remained bonded to the coupler surface to indicate a satisfactory fusion.

I claim:

1. An assembly comprising
  (a) a heat-recoverable article which can be connected to a power supply to cause electrical current to pass through the article and to cause the article to heat and recover; and
  (b) a switch unit which comprises
    (i) an electrical switch which can be connected into a circuit comprising the recoverable article and a power supply, and which, when so connected, regulates the flow of current through the heat-recoverable article, and
    (ii) a thermally-responsive member which can be thermally coupled to the heat-recoverable article and which, when so coupled, controls the electrical switch in response to change in the temperature of the article.

2. An assembly according to claim 1, wherein the article comprise a heat-recoverable element which is composed of a sintered conductive polymer composition comprising
  (a) a matrix consisting essentially of organic polymer particles which have been sintered together so that the particles have coalesced without losing their identity, and
  (b) a particulate conductive filler which is dispensed in said matrix but is present substantially only at or near the boundaries of the coalesced particles.

3. An assembly according to claim 1, wherein the thermally responsive member is a plastic fuse.

4. An assembly according to claim 1, wherein the thermally-responsive member comprises a material that contacts the article and holds the electrical switch in a closed position when the article is within a predetermined temperature range and enables the electrical switch to move to an open position when the material is above the predetermined temperature range.

5. An assembly according to claim 4, wherein the electrical switch moves to an open position when the material melts.

6. An assembly according to claim 4, wherein the material comprises a polymer.

7. An assembly according to claim 6, wherein the polymer comprises nylon filament.

8. An assembly according to claim 1, wherein the electrical switch is a toggle microswitch.

9. An assembly according to claim 1, wherein the article is adapted to be connected to an AC power supply.

10. An assembly according to claim 1, wherein the article is adapted to be connected to a DC power supply.

* * * * *